E. R. ROBINSON.
MOTOR VEHICLE.
APPLICATION FILED MAY 24, 1912.
1,109,018.
Patented Sept. 1, 1914.
3 SHEETS—SHEET 1.
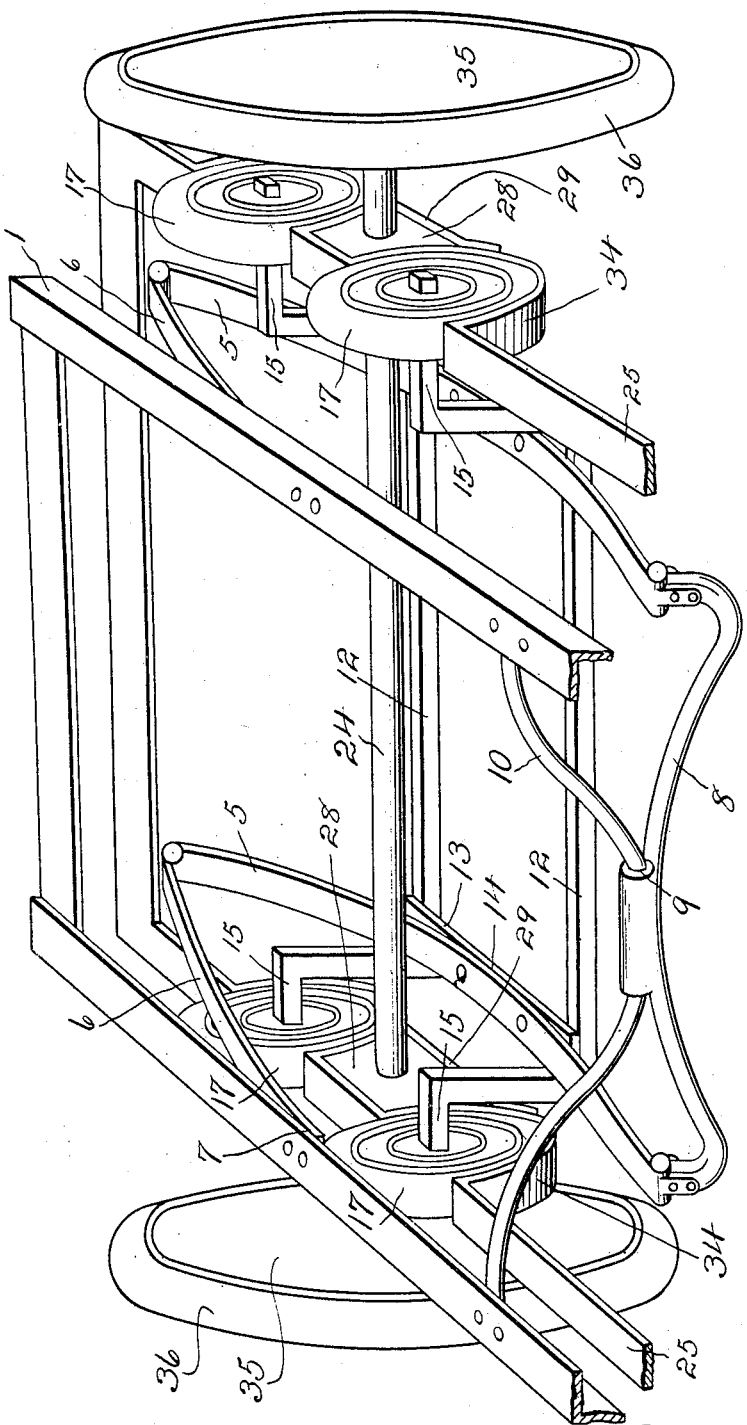
Witnesses
T. P. Britt
E. C. Duffy
Inventor
Elbert R. Robinson,
By O. E. Duffy & Son
Attorneys E. R. ROBINSON.
MOTOR VEHICLE.
APPLICATION FILED MAY 24, 1912.
1,109,018.
Patented Sept. 1, 1914.
3 SHEETS—SHEET 2.
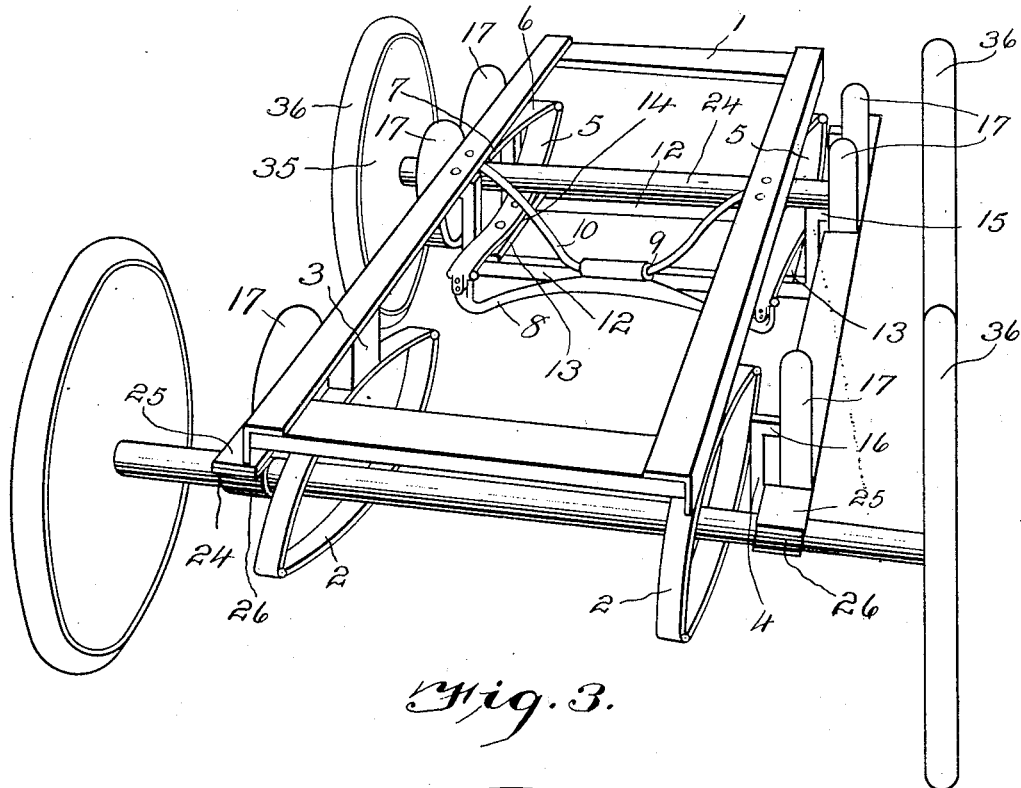
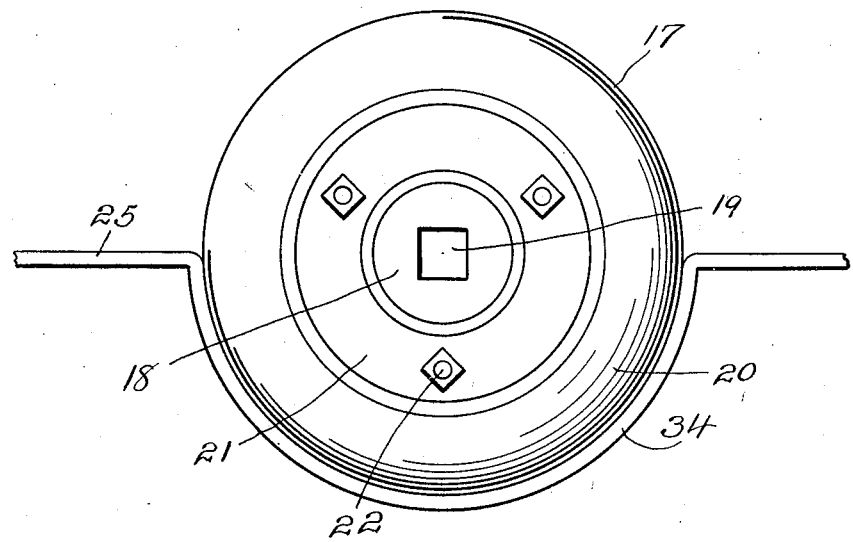
Witnesses
J. P. Britt
E. C. Duffy
Inventor
Elbert R. Robinson,
By
Attorneys E. R. ROBINSON.
MOTOR VEHICLE.
APPLICATION FILED MAY 24, 1912.
1,109,018.
Patented Sept. 1, 1914.
3 SHEETS—SHEET 3.
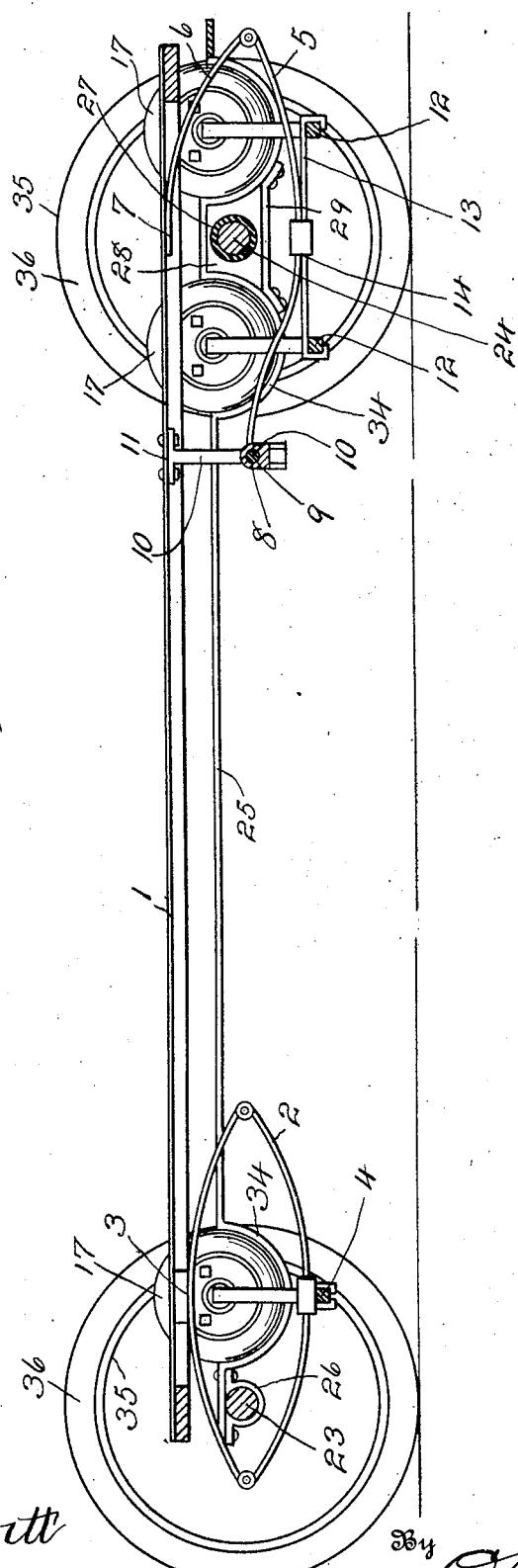
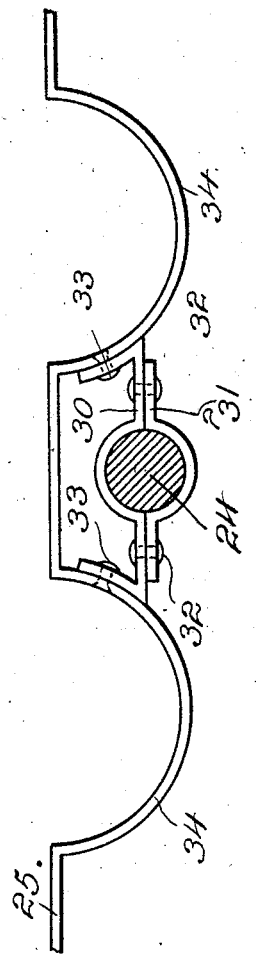
Witnesses
J. P. Britt
E. C. Duffy
Inventor
Elbert R. Robinson,
By
Attorneys

UNITED STATES PATENT OFFICE.

ELBERT R. ROBINSON, OF CHICAGO, ILLINOIS.

MOTOR-VEHICLE.

1,109,018.

Specification of Letters Patent. Patented Sept. 1, 1914.

Application filed May 24, 1912. Serial No. 699,413.

*To all whom it may concern:*

Be it known that I, ELBERT R. ROBINSON, a citizen of the United States, residing at Chicago, in the county of Cook and State of Illinois, have invented certain new and useful Improvements in Motor-Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to the class of vehicles, but more particularly to a motor vehicle, and has for its object to provide an arrangement whereby the body chassis and motive power of the motor vehicle are suspended on pneumatic cushions which are arranged in relation to the main axles and wheels of the motor vehicle in such manner that said pneumatic cushions receive the shock imparted to the wheels to eliminate the same to prevent crystallizing of the main axles and to impart resiliency and an easy suspension for the body chassis and motive power of the motor vehicle.

With this object in view the invention consists in the novel construction and arrangement of the pneumatic cushioning devices and in certain combinations of parts, all of which will be first fully described and afterward specifically pointed out in the appended claims.

Referring to the accompanying drawings: Figure 1 is a fragmentary view of a portion of the chassis of a motor vehicle illustrating the body springs, the pneumatic cushioning devices, the rear axle and rear wheels of a motor vehicle. Fig. 2 is a perspective view of the chassis and running gear. Fig. 3 is an enlarged elevation illustrating the construction of one of the pneumatic cushioning devices and its bed frame. Fig. 4 is a longitudinal vertical sectional view through the running gear and chassis of a motor vehicle. Fig. 5 is a fragmentary elevation of the bed frame for the pneumatic cushioning devices, said figure illustrating a slight modification.

Like numerals of reference indicate the same parts throughout the several figures in which:

1 indicates the chassis of an automobile which may be constructed in any suitable manner but preferably of angle-iron or steel as is shown in the drawings.

2 indicates the front elliptical springs which, as shown in Fig. 4, are full elliptical, the said springs being connected to the chassis 1 at the point 3, the connection between the chassis and the full elliptical springs 2 being effected in any approved manner as by bolts, clips or otherwise.

4 indicates a transverse substantially U-shaped member or axle which supports the lower leaves of the elliptical spring 2, the connection between the elliptical spring 2 and the transverse substantially U-shaped element 4 being by means of bolts, clips or any other approved mechanical arrangement.

At the opposite end of the chassis a half elliptic spring 5 is arranged which connects with a quarter elliptic spring 6 connected to the chassis at the point 7 in such manner as to support the chassis at that point, the said spring being connected in any approved manner, while the forward end of the half elliptic spring 6 is connected to a transverse rod or support 8 (Fig. 1) which in turn is connected at 9 to a transverse rod or brace 10, which transverse rod or brace 10 is connected at its ends to the chassis at the point 11. By means of this construction the chassis 1 is supported on the rear springs in the manner as shown.

Disposed under the half elliptic spring 5 are two transverse substantially U-shaped braces or elements 12 which are connected together by longitudinal brace pieces or straps 13, the elliptic spring 5 being connected to the longitudinal brace pieces or straps 13 at the point 14 (Fig. 4), and as will appear from the drawings this construction supports the said springs in such manner that the body and chassis of the motor vehicle are suspended on the said transverse substantially U-shaped rods or elements 12.

Arranged on the horizontal ends 15 of the rear transverse substantially U-shaped rods or elements 12 and arranged on the ends 16 of the forward transverse substantially U-shaped rod or element 4 are the pneumatic cushioning devices 17, said pneumatic cushioning devices 17 being annular and in the form of wheels, the same comprising a central hub 18 (Fig. 3) being provided with a suitable opening 19 to receive the ends 15 and 16 of the transverse substantially U- shaped rods or elements 12, while a pneumatic casing 20 similar in form and construction to a pneumatic tire is arranged as shown and secured by means of the face plates 21, said face plates 21 being bolted together by transverse fastenings 22.

23 and 24 indicate the main axles of the motor vehicle, said main axles of the motor vehicle being supported on a bed frame 25 which runs longitudinally of the running gear, the forward axle 23 being connected to the bed frame 25 as by means of a clip 26 clearly shown in Fig. 4, while the rear axle 24 may be supported in the manner as shown in Fig. 4 or in the manner as shown in Fig. 5, which latter figure illustrates a slight modification. In the construction shown in Fig. 4 the axle 24 is encompassed by a layer of rubber 27 and passes through a solid block 28 which is secured in position by means of a strap 29; while in the construction illustrated in Fig. 5 the axle 24 is secured in position by means of the two straps 30 and 31 which are bolted together at 32 and are secured to the bed frame 25 by means of the bolts or fastenings 33. By means of the construction illustrated in Fig. 5 a resiliency is imparted to the construction which will be apparent from reference to said Fig. 5. The said bed frame 25 is provided with substantially semicircular bends 34 on radii conforming to the circumferences of the pneumatic cushioning members 17 in such manner that when the structure is in position, illustrated in Fig. 4, the entire body and chassis of the motor vehicle are suspended by means of the said pneumatic cushioning members 17 in the semicircular depressions 34 in the bed frame 25.

35 indicates the usual wheels of the motor vehicle which are preferably provided with solid or cushion tires 36 or with any other suitable construction of tire which is not susceptible to puncture and which is not liable to the derangement and disadvantages of the usual pneumatic tire, it being understood that the specific form of the tires 36 on the usual wheels 35 are immaterial as far as the purposes of this invention are concerned.

Having thus described the several parts of this invention its operation is as follows: The parts being assembled, as before described and as shown in the accompanying drawings, all shock on the main axles of the vehicle are taken up by the pneumatic cushioning devices 17 and the body springs of the vehicle in such manner that a similar effect is produced on the body and chassis of the vehicle as though the vehicle wheels were equipped with the usual pneumatic tires to such an extent that the body chassis and motive power of the vehicle are suspended in a resilient manner and particularly smooth and easy riding of the vehicle is thereby accomplished.

Having thus fully described the invention it is of course apparent that the same is capable of certain changes in form and construction of the parts, and I consider myself clearly entitled to all such changes and modifications as fall within the limit and scope of the appended claims.

What I claim as new and desire to secure by Letters Patent of the United States is:—

1. A vehicle including wheels, axles therefor, a chassis and body springs, a bed-frame connecting said axles together, transverse substantially U-shaped rods, the rear body springs comprising quarter elliptic members connected to said chassis and semi-elliptic members having their forward ends connected to a transverse element or member, said bed-frame having opposite downwardly curved arcuate portions, pneumatic cushioning elements arranged within the resulting depressions of said arcuate portions of the bed-frame said substantially U-shaped rods being arranged under and secured to the semi-elliptic portions of said body springs, said pneumatic cushioning elements being arranged upon the ends of said substantially U-shaped rods.

2. A vehicle including transporting wheels, axles therefor, a chassis, springs connected to said chassis, a bed-frame affording means of connection between said axles, said bed-frame having opposite downwardly curved arcuate bends, connected substantially U-shaped members having their connections secured to said springs, annular pneumatic cushioning members received within said arcuate bends of said bed-frame, themselves receiving the arms or elevated end-portions of said U-shaped members, said arcuate bends being in pairs at the rear end of the chassis, the rear pair of bends having the rear axle arranged intermediate thereof, bearing blocks receiving said rear axle, and straps for holding said bearing blocks in position secured to said rear pairs of bends.

In testimony whereof, I affix my signature, in presence of two witnesses.

ELBERT R. ROBINSON.

Witnesses:
 BENJ. A. CRENSHAW,
 SAM SCROGGS.